United States Patent [19]

Snead

[11] Patent Number: 4,958,977

[45] Date of Patent: Sep. 25, 1990

[54] SYSTEM FOR THE TRANSPORT OF BULK COMMODITIES

[76] Inventor: Edwin deS. Snead, P.O. Box 1000, Georgetown, Tex. 78627

[21] Appl. No.: 302,380

[22] Filed: Jan. 27, 1989

[51] Int. Cl.$^5$ ............................................. B65G 67/02
[52] U.S. Cl. .................................... 414/339; 280/403; 280/408; 105/4.1; 105/21; 414/346; 414/502; 414/526; 414/528
[58] Field of Search ............... 414/239, 346, 345, 389, 414/392, 502, 526, 528; 105/3, 4.1, 4.3, 8.1, 21; 104/25; 280/400, 403, 408

[56] References Cited

U.S. PATENT DOCUMENTS

| | | |
|---|---|---|
| 138,476 | 5/1873 | Caldwell . |
| 387,382 | 8/1888 | Weems . |
| 482,951 | 9/1892 | Stratton et al. . |
| 888,286 | 5/1908 | Wilhite . |
| 1,039,585 | 9/1912 | Pascal . |
| 1,550,239 | 8/1925 | Billings et al. ........................ 414/339 |
| 1,870,575 | 8/1932 | Kiesel, Jr. . |
| 1,920,500 | 8/1933 | Garcia et al. .................... 414/339 X |
| 2,052,867 | 9/1936 | Cartzdafner et al. ................ 105/406 |
| 2,091,721 | 8/1937 | Soderberg et al. .................. 105/410 |
| 2,101,698 | 12/1937 | Anderson ............................ 105/276 |
| 2,457,267 | 12/1948 | Peale et al. . |
| 2,793,597 | 5/1957 | Walters .................................. 105/8 |
| 2,839,010 | 6/1958 | Harbulak ................................ 105/4 |
| 2,906,212 | 9/1959 | Hayes .................................. 104/137 |
| 3,185,108 | 5/1965 | Muller ................................... 104/25 |
| 3,290,058 | 12/1966 | Ellerd ................................... 280/410 |
| 3,540,380 | 11/1970 | Tumpak et al. ..................... 104/246 |
| 3,896,945 | 7/1975 | Bjorklund et al. ............... 105/4.1 X |
| 3,922,971 | 12/1975 | Maroshick ............................ 105/4.1 |
| 4,099,635 | 7/1978 | Leonard et al. ..................... 214/152 |
| 4,128,180 | 12/1978 | Mellious ............................ 214/44 A |
| 4,318,345 | 3/1982 | Kleim ................................... 105/15 |
| 4,579,063 | 4/1986 | Losa et al. ...................... 280/403 X |
| 4,644,872 | 2/1987 | Vianello et al. ..................... 105/8.1 |
| 4,712,965 | 12/1987 | Canziani ............................... 414/339 |
| 4,723,886 | 2/1988 | Frederking ......................... 414/339 |
| 4,754,710 | 7/1988 | Kieres ................................... 105/335 |
| 4,766,818 | 8/1988 | Wicks et al. .................... 280/408 X |
| 4,830,562 | 5/1989 | Frederking ......................... 414/339 |

FOREIGN PATENT DOCUMENTS

| | | |
|---|---|---|
| 533304 | 9/1931 | Fed. Rep. of Germany . |
| 1481286 | 2/1969 | Fed. Rep. of Germany . |

*Primary Examiner*—Robert J. Spar
*Assistant Examiner*—Robert S. Katz
*Attorney, Agent, or Firm*—Harrison & Egbert

[57] ABSTRACT

A material transport system having a material container for receiving material to be transported, motive members connected to the material container for allowing the material container to move from one place to another, and an unloader device positioned within the material container for unloading material therefrom. The material container has a generally flat floor extending between a pair of sidewalls. The unloader includes a tractor extending between the sidewalls of the material container and a shovel articulated to the tractor. The shovel has a size suitable for fitting between the sidewalls of the material container. The material container comprises a plurality of railroad cars having a generally flat roadway extending throughout the plurality of railroad cars. Each of the railroad cars is articulated to an adjacent car. The floor comprises a series of floor segments overlapping each other in the same direction. The sidewalls include an overlapping portion held in torsional engagement against an adjacent sidewall. The motive members include railroad trucks attached at the articulated connection of adjacent pairs of railroad cars. A plurality of slots are formed transversely in the floor for engaging the grousers of the tractor.

12 Claims, 6 Drawing Sheets

SYSTEM FOR THE TRANSPORT OF BULK COMMODITIES

TECHNICAL FIELD

The present invention relates to material transporting systems. More particularly, the present invention relates to trains having the capability for remote unloading. In addition, the present invention relates to continuous gondola car configurations.

BACKGROUND ART

In the late 1980's, the cost of transporting commodities by rail in the United States was approximately three cents per revenue-ton mile, plus about one dollar per ton as fixed cost. The comparable cost of transportation by motor truck on public highways was approximately eight cents per revenue-ton mile, also plus an additional one dollar per ton as fixed cost.

The carrier's cost is primarily composed of two major direct costs and two major indirect costs. The largest direct cost is labor for the train crew or for the truck driver. In this instance, railroads enjoy about a 50 to 1 advantage over trucks. Trains are capable of enabling five men to transport 10,000 tons of material. On the other hand, a single truck driver can transport only about 25 tons. This is approximately an 80 to 1 benefit relative to labor costs. The second major direct cost is fuel, in which case the railroads can produce three to five times as many revenue-ton miles per gallon or per dollar of fuel as the trucks can produce.

One of the major indirect costs is the investment in the rolling stock. A 10,000 ton load requires at least five locomotives (costing one million dollars each) plus 100 freight cars at approximately forty thousand dollars apiece. This investment amounts to approximately one thousand dollars per ton of capacity. On the other hand, a new truck and trailer for hauling bulk commodities might cost in the range of one hundred thousand dollars for a 25 ton capacity, or about four thousand dollars per ton of capacity. Once again, the railroads show about a 4 to 1 advantage over trucks in this area.

The other major indirect cost is the upkeep of the roadway. American railroads spend approximately one-half cent per revenue-ton mile for maintenance of way and structures. Trucks running on public roads pay fuel, taxes and registration and use taxes which add up to roughly the same amount.

Based on the foregoing examples, railroads show approximately a 4 to 1 advantage in the cost of rolling equipment a 4 to 1 advantage in fuel and a 80 to 1 advantage in operator wages. Based on these numbers, it would seem that railroads should be able to completely dominate the transportation of bulk commodities.

In practice, however, railroads are most suited for hauling very large quantities (e.g. 10,000 tons in a unit train of coal). Whereas, sand, gravel, stone, and other bulk commodities seldom travel in such large quantities to make up a complete maximum train. This means that many shipments must be delayed while waiting for the railroads to assemble less than trainload lots into an economical train. After the material arrives at the destination, it still must be unloaded from the railroad cars and carried to the point of use. In many cases, this involves truck transportation, and in all cases it involves the unloading of railroad cars.

Many systems have been devised for fast unloading of railroad cars. Most of these require expensive facilities costing millions of dollars. Such systems serve to turn the cars upside down or allow the material to be dropped through the track onto conveyer systems. Unfortunately, a large portion of the sand, gravel, and stone moved by railroads travels in open topped gondola cars which must be unloaded by hand or by some type of machinery. Usually, such machinery dips out one bucket at a time and places it on the ground or onto waiting trucks. This is a fairly slow process which also requires a large number of cars to wait while a single machine unloads them at a time.

Various United States patents have shown rather cumbersome methods for unloading such gondola cars. U.S. Pat. No. 4,099,635, issued on July 11, 1987, to Leonard et al, shows a loader that moves along the top edges of adjacent gondola cars. A shovel then dips into the gondola cars for loading and unloading. U.S. Pat. No. 4,723,886, issued on Feb. 9, 1988, to L. E. Ferderking, shows an apparatus for loading and unloading gondola cars. This device also utilizes tracks that extend along the top edge of the gondola car so that a hydraulic excavator may dip into the gondola car so as to extract material. These prior art patents show devices that are quite cumbersome and difficult to use. Since a great deal of leverage is required for the operation of these types of tractor/shovel systems, complicated attaching mechanisms, external lines, and other devices are required so as to maintain the apparatus in proper position, and with proper leverage, along the top edges of the railroad car.

Because most railroad shipments are less than a unit train load, their arrival cannot be predicted with any degree of certainty. As a result, loaded cars must frequently wait several days to be unloaded. Because of these and other problems, the average United States railcar makes only about one revenue trip per month, whereas the average truck makes several revenue trips per week, and on short hauls may even make five or six revenue trips per day.

As a result, one of the major indirect advantages of rail transportation is totally eliminated and reversed. That is, rather than having a 4 to 1 advantage in the investment of rolling stock per ton of capacity, under present methods, the railroads suffer at least a 4 to 1 disadvantage in this factor.

The present invention serves to eliminate the major disadvantage of rail transportation by allowing small shipments to be unloaded immediately upon arrival. This enables the whole assembly of locomotive and cars to make a revenue trip every day or even more on very short hauls.

The use of gondola cars having a continuous trough extending throughout the cars would be one solution to the problem. Such a continuous load-carrying car would enable a vehicle to traverse the interior of the train while unloading. Unfortunately, the only continuous gondola car configuration is not designed to be unloaded by a vehicle traversing the floor.

U.S. Pat. No. 4,754,710, issued on July 5, 1988, to K. C. Kieres describes a railway car for carrying freight. In particular, this patent describes the use of a continuous railway car having one continuous trough. The trough is supported at each end wall by trucks. The sidewalls are made up of a plurality of side panels. The side panels have overlapping systems to permit relative motion between adjacent panels for maneuvering curves and hills. The floor has a plurality of laterally and longitudinally extending slope sheets. A flexible center sill extends continuously for the entire length of the railway car.

It is an object of the present invention to provide a system for the unloading of gondola cars and allow such cars to be unloaded at a remote location.

It is another object of the present invention to provide a system that enables conventional tractor/shovel configurations to be utilized for the unloading of gondola cars.

It is still a further object of the present invention to provide a gondola car configuration that allows such gondola cars to be utilized around the sharpest of turns.

It is still a further object of the present invention to provide an unloading system that enables the tractor/shovel to gain sufficient leverage for effective material unloading.

It is another object of the present invention to provide an unloading system that maximizes economies and capacities while minimizing expense, complexity, and capital and labor investment.

These and other objects and advantages of the present invention will become apparent from a reading of the attached specification and appended claims.

SUMMARY OF THE INVENTION

The present invention, in its broadest embodiment, is a material transport system that comprises a material container for receiving material to be transported, motive power connected to the material container for allowing the material container to move from one place to another, and an unloader positioned within the material container for unloading material. The material container has a generally flat long floor extending between a pair of sidewalls. The unloader is made up of a tractor extending between the sidewalls of the material container and a shovel articulated to the tractor. The tractor serves to selectively move the unloader longitudinally along the floor. The shovel has a size for fitting between the sidewalls of the material container. The shovel passes material from between the sidewalls to a location external of the material container.

In more specific embodiments, the material container comprises a plurality of railroad cars having a generally flat roadway extending throughout. Each of the plurality of railroad cars is articulated to an adjacent car. Each of the floors of the railroad cars overlaps a portion of the floor of an adjacent railroad car. The overlapping of floors is in the same direction throughout the length of the roadway. In addition, each of the railroad cars has an overlapping pair of sidewalls or sidewall panels that engage an adjacent pair of sidewalls on an adjacent railroad car. These overlapping sidewalls are in torsional engagement with an adjacent pair of walls. The railroad cars are permanently coupled by articulated joints to an adjacent railroad car.

The motive power is provided by two axial railroad trucks attached at the area of articulated connection of adjacent pairs of railroad cars.

The floor of the material container is in frictional relationship with the tractor of the unloader. Specifically, the floor has a plurality of slots formed transversely therein. These slots engage a portion of the tractor. The tractor is a crawler having grousers extending across the crawler. The slots engage the grousers during the longitudinal movement of the tractor. The plurality of slots comprise aligned pairs of slots extending between the sidewalls. The width of each of the aligned pairs of slots is less than the width of the shovel. The shovel has a width slightly less than the width of the floor.

The unloader also includes a turntable rotatably mounted to the tractor. The shovel is in articulated connection to this turntable. This turntable enables the shovel to be rotated away from the floor for the purpose of unloading. As an alternative, the unloader may also include an auger rotatably mounted within the shovel. This auger moves material toward the center of the shovel. A conveyer is then arranged adjacent the center of the shovel. The conveyer moves the material away from the auger to a location external of the material container.

A subfloor is affixed to the lower side of the floor. This subfloor is a continuous metal sheet. The slots of the floor open through the floor to this subfloor. In the specific embodiment, the railroad oars are gondola cars.

It is important to note, in its broadest embodiment, the present invention should not be limited to trains or train systems. It is also possible that the present invention is applicable, useful, and important in the unloading of other material transport vehicles, such as barges.

The present invention also includes a method of unloading a continuous gondola train. The method of the present invention comprises the steps of: (1) placing a tractor shovel in one end of the gondola car train; (2) actuating the tractor shovel such that the bucket of the tractor shovel receives material from the gondola car train; (3) moving the tractor shovel longitudinally within the train such that the bottom of the bucket slides along the floor of the train so as to gather more material; (4) lifting the bucket from the floor of the train until the bucket is at a position above the sidewalls; (5) rotating the bucket so that the bucket extends outwardly beyond the sidewalls; and (6) discharging the material from the bucket exterior of the gondola car train. Since the floor of the train has a plurality of slots formed therein, the present invention also includes the method of engaging the grousers of the tractor shovel into a portion of the plurality of slots in the floor.

The tractor shovel is moved continuously longitudinally throughout the length of the continuous gondola car train. The final step involves removing the tractor shovel from the continuous gondola car train by travelling back to the same end of the train where it entered.

DETAILED DESCRIPTION OF THE INVENTION

Figure 1:
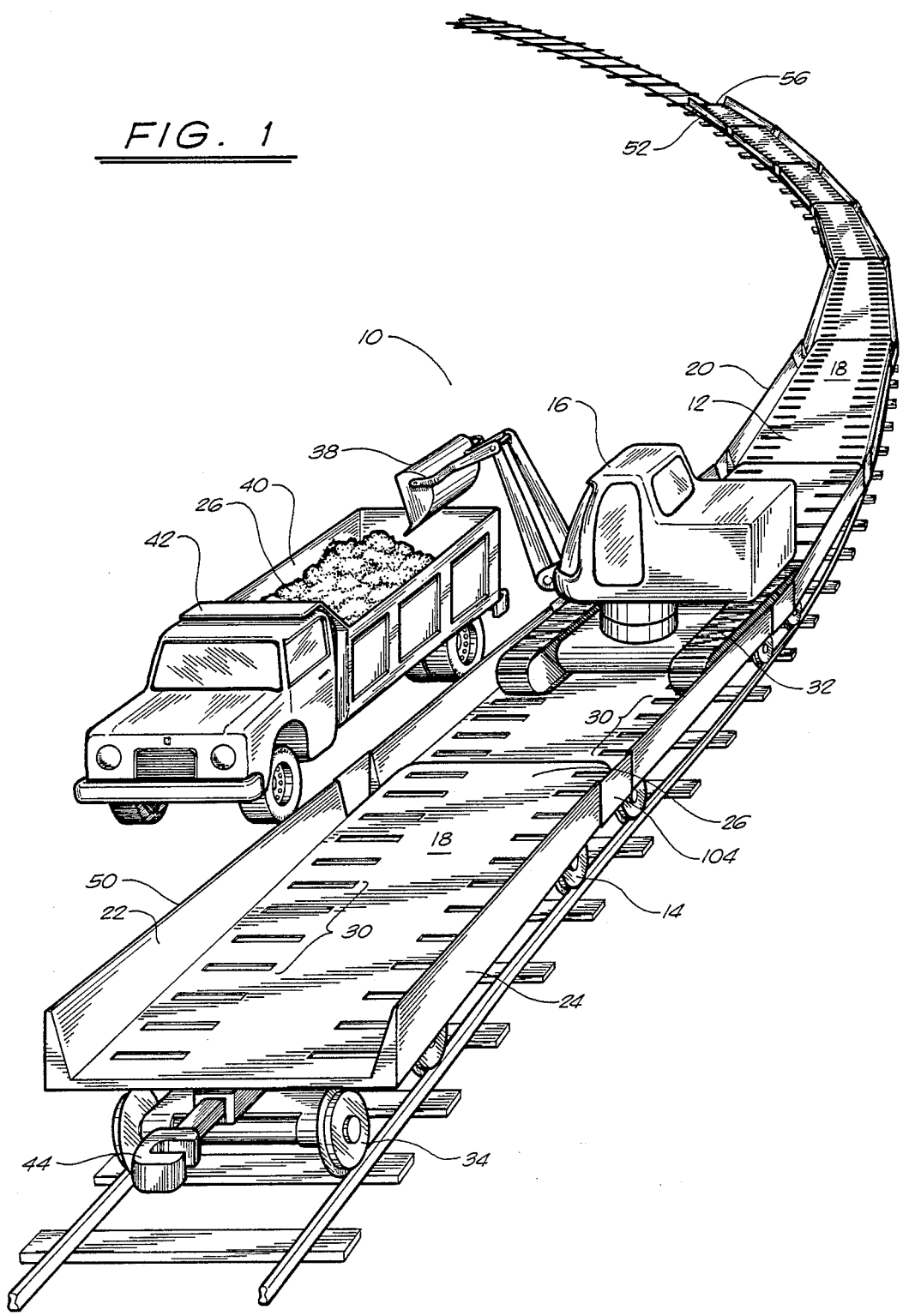
FIG. 1 is a perspective view of the material transport system in accordance with the preferred embodiment of the present invention.

Referring to FIG. 1, there is shown at 10, the material transport system 10 in accordance with the preferred embodiment of the present invention. In the material transport system 10, there is shown the material container 12, the motive members 14, and the unloader 16. Importantly, although the material transport system, shown at 10, is of a continuous gondola car configuration, this is not intended to limit the scope of the present invention. The scope of the present invention may be applicable to many other material transport arrangements and suitable for the unloading of barges, trucks, and various types of railroad cars other than gondola cars.

The material container 12 receives the material to be transported. Material container 12 has a generally flat floor 18 that extends for the length of the train 20 between continuous sidewalls 22 and 24.

The material container is, in general, a plurality of gondola cars 20 having a generally flat roadway 18 extending throughout. Each of the gondola cars 20 is articulated to an adjacent gondola car. As can be seen in FIG. 1, each of the railroad cars has a floor portion 26 that overlaps a portion of the floor of an adjacent gondola car 20. Throughout the train, the overlapping portion 26 occurs in the same direction. The purpose for this overlapping is to allow the shovel of the unloader 16 to traverse the length of the train 20 without encountering a protruding overlap.

A plurality of slots 30 are formed transversely in floor 18 of railroad cars 20. These slots 30 engage portion of the tractor 32 of unloader 16.

Figure 2:
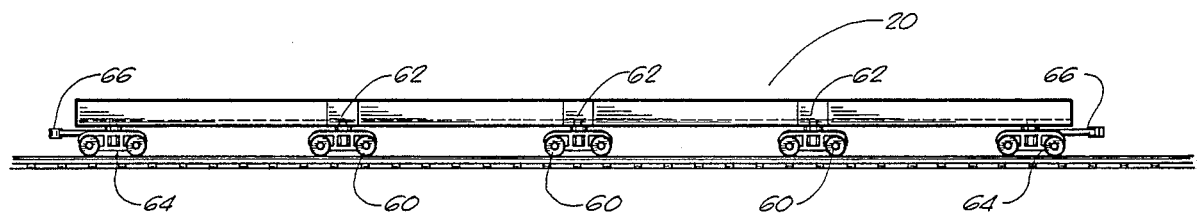
FIG. 2 is a diagrammatic side view of the continuous gondola car configuration of the present invention.

The motive members 14 comprise two axial railroad trucks 34 that are attached to the train at the articulated connection of adjacent pairs of the railroad cars 20. A more detailed view of this is shown in FIG. 2, to be described hereinafter.

The unloader 16 comprises a tractor 32 that extends between the side walls of material container 12. The tractor 32 selectively moves the unloader 16 longitudinally along the floor 18 of train 20. A shovel 38 is articulated to the tractor 32. The shovel 38 has a size suitable for fitting closely between the sidewalls 22 of train 20. The shovel 38 passes material from between the sidewalls to locations external of the material container 12. As shown in FIG. 1, shovel 38 receives the material from the floor 18 and passes such material into the bed 40 of dump truck 42. In keeping with the present invention, shovel 38 could also deposit the material 26 at any other location alongside train 20.

Train 20 includes standard couplings 44 for connecting the train 20 to other cars or to locomotives.

As to the details of the preferred embodiment, the train 20 is made up of twenty permanently coupled units having a capacity of approximately fifty net tons each. The cars 50 and 52 at the end of the train 20 are equipped with standard two axial trucks and standard couplings. These end units 50 and 52 have a nominal capacity of seventy-five tons, as compared to the fifty ton capacity to the intermediate units. In a one thousand ton train, the two end units 50 and 52 have a capacity of one hundred and fifty tons, while the remaining eight hundred and fifty tons are distributed throughout the remaining cars. An entire one thousand net ton train 20 would be supported by twenty trucks.

Although it is not shown in FIG. 1, train 20 may have an end gate at end 56. This is the end where the unloading device finishes unloading the car. The end gate 56 may be lowered so as to rest on the standard couplings between two adjacent continuous gondola cars to allow the unloading device to travel from one set of such gondola cars to another set. At the end 58, there is no end gate. It is possible that a folding ramp may be incorporated into end 58 so as to allow the unloader 16 to crawl up and down in order to get into and out of the car 50.

FIG. 2 shows a side view of train 20 and the configuration of the gondola cars. As can be seen in FIG. 2, the two axle railroad trucks 60 are positioned at the articulated connection 62 of adjacent gondola cars. It can also be seen at 62 that the trucks 64 are mounted in conventional position at the end of train 20. Standard coupling 66 extends beyond each of the ends of train 20.

Figure 3:
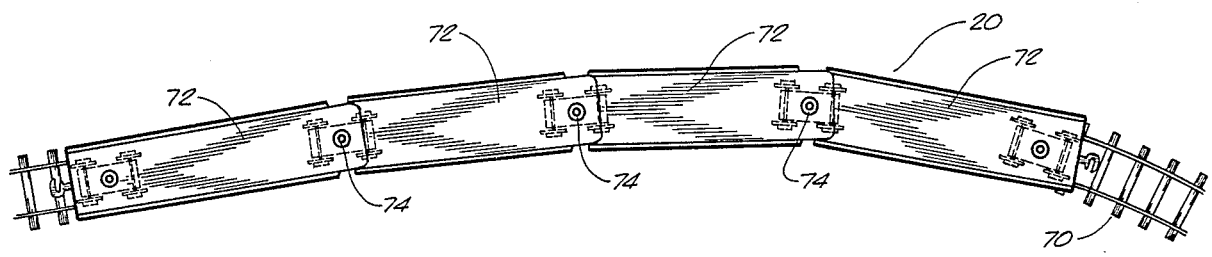
FIG. 3 is a top view of the continuous gondola car configuration of the present invention.

FIG. 3 shows a top view showing the ability of the continuous gondola car train 20 of the present invention to traverse tight sections of curved track 70. It can be seen that the entire train has one continuous floor 72 made up of plates which overlap in the region of the articulated couplings 74. This allows the floor of one unit to slide over the floor of an adjacent unit as the train 20 negotiates curve 70. In one specific model of the train, having approximately 33⅓ feet between couplings 74, it was shown that the train could negotiate a twenty-seven degree per one hundred feet curve. This is a sharper curve then can be found in nearly any United States system. In the negotiating of this curve, the maximum angle between adjacent units 72 is nine degrees.

Figure 4:
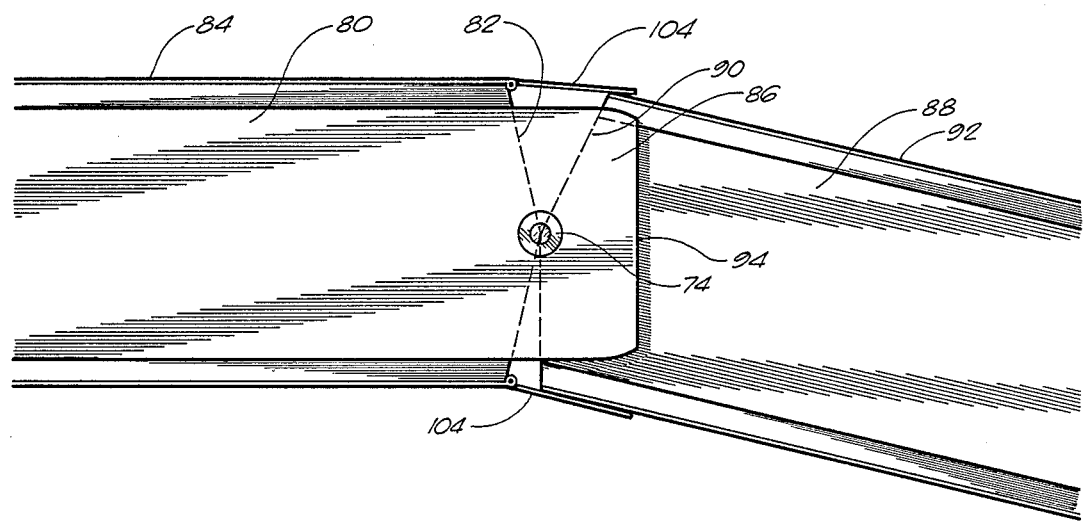
FIG. 4 is a detailed view showing the articulated junction between adjacent pairs of gondola cars in accordance with the present invention.

FIG. 4 shows a detail of the arrangement of a coupling 74. In FIG. 4, gondola car floor 80 has a flat configuration that extends beyond the end 82 of car 84. This extensive portion 86 overlaps floor 88 of an adjacent car. Articulated coupling 74 joins the end 82 of car 84 and the end 90 of car 92. Coupling 74 extends through floor 80 so as to maintain the overlapping relationship with floor 88. It can also be seen that the ends 82 and 90 have a prism configuration. This prism type of configuration allows the train to negotiate turns of great curvature. By using a prism shape, proper clearances are established and the proper coupling relationship is maintained. Since the floor 80 is in overlapping relationship with floor 88, no material will spill through the area between end walls 82 and 90. As the shovel 38 of the unloader passes in the left-to-right direction, the shovel will drop a small distance when passing over the overlapping end 94 of floor 80. As such, the overlapping pattern is maintained in the same direction throughout the train. The arrangement given in the present invention makes it impossible for the shovel to snag and damage the overlapping wall and floor pieces with its bucket while scooping up material.

Figure 5:
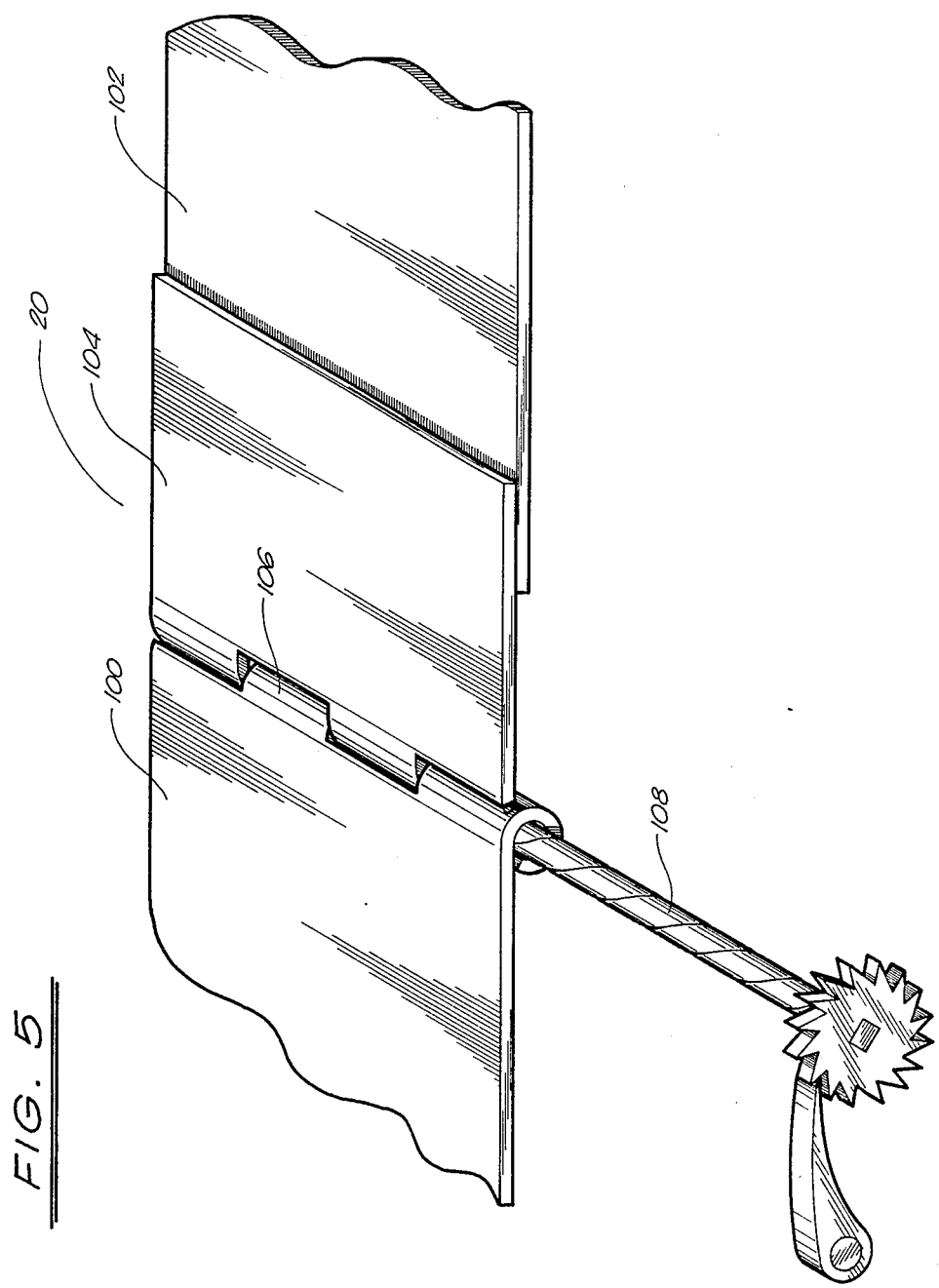
FIG. 5 is a detailed view showing the spring-loaded plates for closing the gaps between adjacent cars while allowing a sliding contact as the train negotiates curves.

FIG. 5 is a detailed view showing the arrangement of the side panels of train 20. In particular, FIG. 5 shows fixed side 100 of one gondola car and a fixed side 102 of adjacent gondola car. A gap closer 104 (or overlap side panel) is hinged at 106 to side 100. The gap closing panel 104 is acted on by hinge pin 108. Hinge pin 108 acts as a torsion member exerting a torque on overlap panel 104 such that panel 104 is maintained in continuous forced engagement with fixed side panel 102 of the adjacent gondola car. When the train must negotiate a turn, the gap closing panel 104 will turn while maintaining a strong force against the surface of panel 102. One again, the overlap panel, as used throughout the train, will overlap in the same direction. This prevents damage to the panel from the use of the shovel or the accidental abutment of the shovel with the panel.

Figure 6:
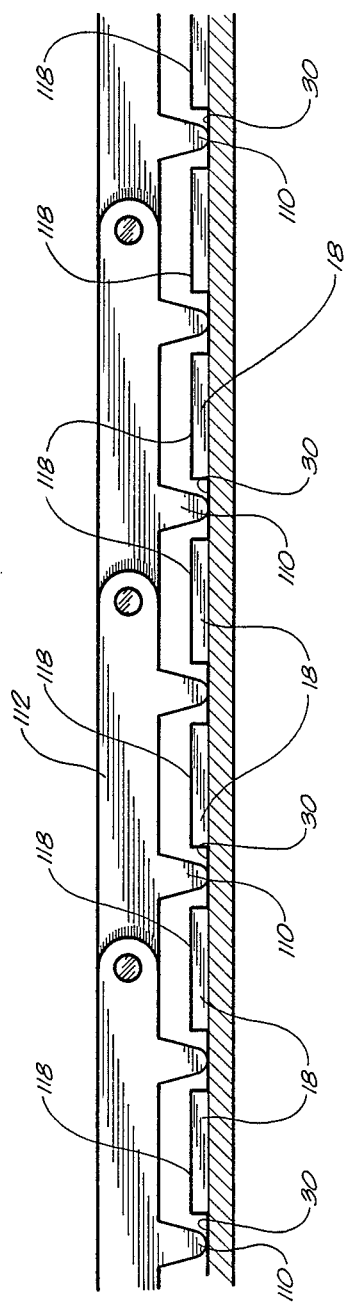
FIG. 6 is a close up side view showing the relationship between the grousers of the crawler and the slots in the floor of the continuous gondola car.

FIG. 6 shows, in detail, the arrangement of the slots 30 within the floor 18 of the gondola cars 20. In addition, FIG. 6 shows the relationship of the grousers 110 with the slots 30. With reference to FIG. 1, the tractor 32 has crawlers 112 mounted thereon. Crawlers 112 allow the unloader 16 to move along the train 20. Crawlers 112 have a plurality of grousers 110 extending thereacross. Slots 30 have been formed within floor 18 so as to provide appropriate traction during the lifting and unloading phase of unloader 16. If the unloader 16 were equipped with a rubber tired undercarriage, there may be enough friction between the tires and the floor 18 of the cars 20 to provide the thrust necessary to pick up the load 26. However, for track mounted equipment, such as that shown in FIG. 1 and FIG. 6, the friction between steel tracks 112 and the steel floor 18 will not be sufficient. To accommodate this difficulty, the slots 30 are provided on the floor 18. These slots have a size of approximately one-half inch deep and about six inches wide. These slots have a width of about one inch running in the longitudinal dimension of the car. These slots are cut into the steel floor (having a thickness of approximately one-half inch). The resulting holes in the floor are covered by welding steel plates onto the bottom of the floor.

In use, the grousers 110 on the crawlers 112 of unloader 16 would fit into the slots 30. This provides more than enough traction to provide the thrust to crowd the bucket into the pile of material being unloaded. As analogy, this is done in a manner similar to a rack-and-pinion system with the rack being provided by the special bottom of cars 20 and the pinion being the crawlers 112 and their attached grousers 110.

To prevent the shovel 38 from catching in the slots 30, the outboard end of the slots is a substantial distance (several inches) away from the bottom edge of the side wall. As a result, the shovel is wider than the overall width of the pair of slots and would fit very closely into the car itself. The bucket of shovel 38 then slides smoothly over the surface 118 of floor 18. During use, the shovel is supported at all times in three places, that is, the outboard edges and the center.

After unloading, the only material left in the car would be the volume left in the slots 30. The material in the slots 30 is crushed by the track grousers 110. It is estimated that such material adds up to less than thirty pounds per unit. This remaining material can easily be picked up by an industrial vacuum cleaner or otherwise removed from the train 20.

Figure 7:
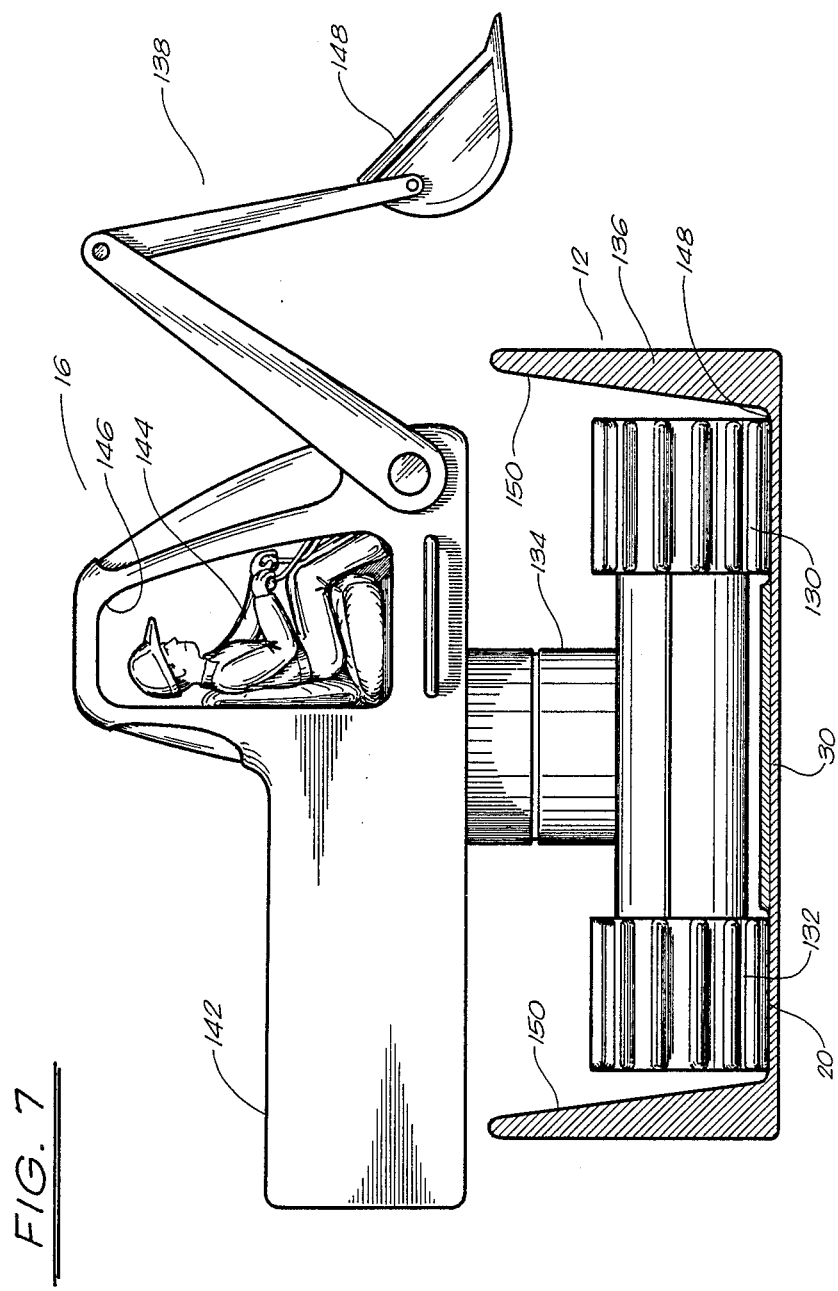
FIG. 7 is an end view showing the position of the tractor/shovel within the material container.

FIG. 7 shows the arrangement of the unloader 16 within the material container 12. As shown in FIG. 7, the material container can be a container other than a gondola car. It can be seen that shovel 16 is a piece of earth-moving equipment. Unloader 16 is a tractor shovel which is mounted on crawlers 130 and 132. The upper body of unloader 16 is mounted on turntable 134. Turntable 134 allows the device to pick up a bucketload full of material and lift it over the sidewalls 136 of the gondola car. Turntable 134 allows the shovel 138 to be turned ninety degrees or more. Following the turning, the bucket 140 of shovel 138 may discharge the material onto the ground or onto a waiting truck. Unloader 16 has a counterweight 142 at its rearward end so as to balance the load contained within bucket 140 of shovel 138. The operator 144 sits within a compartment 146 on the unloader 16. Unloader 16 resembles a caterpillar Model No. 215 or No. 225 tractor shovel. It has been found that this type of unloader is satisfactory for this application. It is only necessary to equip this tractor shovel with a bucket 140 that has a width which exactly fits into the bottom 148 of the material container 12.

In the view of FIG. 7, it can be seen that the interior sidewalls 150 are angled inwardly so that the load within the material container 12 is encouraged to pass to floor 148. Floor 30 (and its subfloor) support walls 150. The slots 30 are shown in FIG. 7 in position for receiving the grousers of crawlers 130 and 132.

Figure 8:
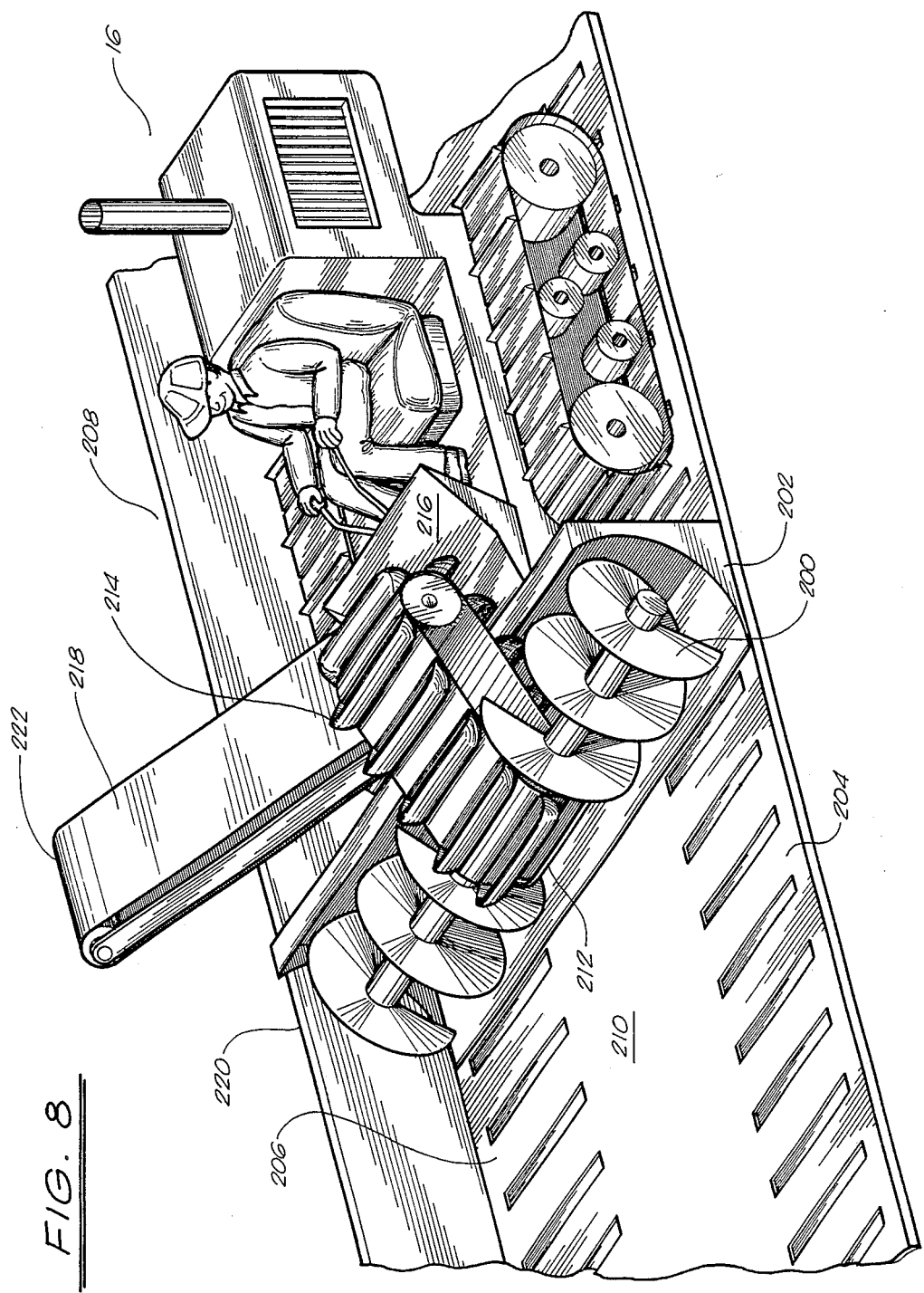
FIG. 8 is an alternative embodiment of the unloading system of the present invention.

FIG. 8 shows another type of unloader 16. Unloader 16 has an auger 200 that is rotatably mounted within shovel 202. The auger 200 operates on the front of shovel 202 so as to collect materials from the sides 204 and 206 of the car 208. During the longitudinal movement of the unloader 16 along floor 210 of car 208, the auger 200 moves the material to the center 212 of shovel 202. When the material reaches the center of shovel 202, the material is picked up by a bucket conveyer 214. Once the material is elevated by the bucket conveyer 214, it is dumped into and through hopper 216. The material then passes to conveyer belt 218 which carries the material over the side 220 of car 208. After the material discharges from end 222 of conveyer belt 218, it is deposited on the ground or into a waiting truck. The unloader 16 shown in FIG. 8 is somewhat similar to a device manufactured by the Athey Company. This device has been used successfully for this type of application. Unloader 16 can unload the gondola car configuration by moving along the floor 210 throughout the length of the continuous gondola car configuration. The shovel 202, as seen in FIG. 8, has a width that is nearly identical to the width of floor 210 between walls 204 and 206.

The operation of the present invention can best be described with reference to FIG. 1. Initially, the unloader (tractor shovel) 16 is placed onto end 58 of train 12. Once the unloader 16 is placed onto the end 58, the bottom of shovel 38 is juxtaposed against floor 18. The unloader is then actuated so that the shovel 38 receives material 26 contained within the gondola cars of train 20. The shovel 16 is then moved along its tracks 32 longitudinally within and along floor 18. As the unloader moves through the length of train 20, the shovel 38 receives material 26 until the shovel 38 is filled. The bucket 38 is then lifted from the floor 18 until the bucket is in a position above the top of sidewalls 22 and 24 of train 20. The unloader 16 then rotates so that the bucket 38 extends outwardly beyond the sidewalls 22 and 24. The material 26 is then discharged on the exterior of train 20. The material also may be discharged into the dump truck 42.

After the unloader 16 traverses the entire length of the gondola car arrangement 20, the unloader 16 backs out to the end where it entered or lowers the gate at end 56 and moves into the next continuous gondola. The unloader may then wait for the next arrival of the continuous gondola car configuration or it may be loaded for transport elsewhere. The unloader 16 could travel with the train for short trips or for shipments requiring only a few car loads. For bigger shipments, unloader 16 could crawl out of the car, that is out of the empty car, and wait for another loaded car to be brought in by the next train. In either case, the train can be unloaded immediately upon arrival, and within an hour or two, be on its way back empty for another load.

The present invention achieves a number of advantages not found by prior art systems. Unlike the prior art systems, no cables, strands, or other mechanisms are required to provide the necessary leverage for the unloading of the train. If leverage and friction is required, then the slots of the present invention provide suitable friction for the unloading operation. This friction is important for allowing the maximum loads to be removed during the unloading process. This greatly enhances the efficiency and expediency of the unloading process.

Since the present invention utilizes a rather standard tractor shovel, the unloading device can be readily available. Many facilities may have comparable devices, thus eliminating the need to haul the unloader. Alternatively, the unloader can be brought to the site and utilized when required. This allows the present invention to be adaptable to a wide variety of transport requirements.

In comparison with prior art systems, the present invention does not require the sophisticated operation of crawling to the top edges of the gondola car. Additionally, a much higher percentage of the material within the gondola cars can be removed then with prior unloading systems. As a result, the present invention achieves advantages in manpower savings, cost savings, scheduling abilities, material delivery, and ease of use that is not found in any prior art systems.

The foregoing disclosure and description of the invention is illustrative and explanatory thereof. Various changes in the details of the illustrated construction, or in the details of the method of the present invention, may be made within the scope of the appended claims without departing from the true spirit of the invention. The present invention should be limited by the following claims and their legal equivalents.

I claim:

1. A material transport system comprising:
  a material container means for receiving material to be transported, said material container means having a generally flat floor extending between a pair of side walls, said material container means comprising a plurality of railroad cars, said flat floor extending through said plurality of railroad cars, each of said railroad cars being articulated to an adjacent car;
  motive means connected to said material container means for allowing said material container means to move from one place to another; and
  unloader means positioned within said material container means for unloading material from said material container means, said unloader means comprising:
    tractor means extending between said side walls of said material container means, said tractor means for selectively moving said unloader means longitudinally along said floor; and
    a shovel articulated to said tractor means, said shovel having a size for fitting between said side walls, said shovel for passing material from between said side walls to a location external of said material container means, said floor of said material container means being in frictional relationship with said tractor means of said unloader, said floor having a plurality of slots formed transversely therein for engaging a portion of said tractor means.

2. The system of claim 1, each of said railroad cars having a floor overlapping a portion of the floor of an adjacent railroad car, said overlapping being in the same direction throughout the length of said flat roadway.

3. The system of claim 2, each of said railroad cars having a pair of car sidewalls and an overlapping pair of car sidewall members engaging an adjacent pair of car sidewalls on an adjacent railroad car, thereby forming said pair of material container means sidewalls.

4. The system of claim 3, said overlapping pair of car sidewall members in torsional engagement with said adjacent pair of car sidewalls.

5. The system of claim 1, each of said plurality of railroad cars being permanently coupled by articulated joints to an adjacent railroad car.

6. The system of claim 1, said motive means comprising two axle railroad trucks attached at the articulated connection o adjacent pairs of said plurality of railroad cars.

7. The system of claim 1, said tractor means comprising a crawler having grousers extending across said crawler, said slots engaging said grousers during the longitudinal movement of said tractor means.

8. The system of claim 7, said plurality of slots having aligned pairs of slots extending between said sidewalls of said gondola car, the width of each of said aligned pair being less than the width of a bucket of said shovel.

9. The system of claim 1, said shovel including a bucket having a width approximately the width of said floor.

10. The system of claim 1, said unloader further comprising:
  a turntable rotatably mounted to said tractor means, said shovel in articulated connection to said turntable, said turntable for enabling said shovel to be rotated away from said floor.

11. The system of claim 1, said unloading means further comprising:
  an auger rotatably mounted in said shovel, said auger for moving material toward the center of said shovel; and
  a conveyer means positioned adjacent the center of said shovel, said conveyer means for moving said material away from said auger to a location external of said material container means.

12. The system of claim 1, further comprising:
  a subfloor affixed to the lower side of said floor, said subfloor being continuous, said slots opening through said floor to said subfloor.

* * * * *